(12) United States Patent
Collier et al.

(10) Patent No.: US 9,283,519 B2
(45) Date of Patent: Mar. 15, 2016

(54) FILTER COMPRISING COMBINED SOOT OXIDATION AND NH₃-SCR CATALYST

(75) Inventors: Jillian Elaine Collier, Reading (GB); Ralf Dotzel, Nuremberg (DE); Sylvie Cécile Laroze, Brightwell Cum Sotwell (GB); Rainer Leppelt, Lichtenfels (DE); Paul James Millington, Reading (GB); Jörg Werner Münch, Lichtenfels (DE); Raj Rao Rajaram, Slough (GB); Hubert Schedel, Küps (DE)

(73) Assignee: Johnson Matthey Public Limited Company, London (GB)

( * ) Notice: Subject to any disclaimer, the term of this patent is extended or adjusted under 35 U.S.C. 154(b) by 89 days.

(21) Appl. No.: 13/384,572

(22) PCT Filed: Feb. 1, 2011

(86) PCT No.: PCT/GB2011/050170
§ 371 (c)(1),
(2), (4) Date: Jan. 17, 2012

(87) PCT Pub. No.: WO2011/092525
PCT Pub. Date: Aug. 4, 2011

(65) Prior Publication Data
US 2012/0121486 A1 May 17, 2012

Related U.S. Application Data (60) Provisional application No. 61/300,279, filed on Feb. 1, 2010.

(51) Int. Cl.
| | | |
|---|---|---|
| *B01D 53/94* | (2006.01) | |
| *B01J 35/04* | (2006.01) | |
| *B01J 23/30* | (2006.01) | |
| *B01J 23/83* | (2006.01) | |
| *B01J 23/888* | (2006.01) | |
| *B01J 37/00* | (2006.01) | |
| *C04B 35/50* | (2006.01) | |
| *C04B 35/634* | (2006.01) | |
| *C04B 35/636* | (2006.01) | |
| *C04B 35/80* | (2006.01) | |
| *C04B 35/82* | (2006.01) | |
| *C04B 38/00* | (2006.01) | |
| *B01J 29/74* | (2006.01) | |
| *B01J 29/78* | (2006.01) | |
| *F01N 3/035* | (2006.01) | |
| *C04B 111/00* | (2006.01) | |

(52) U.S. Cl.
CPC .......... *B01D 53/9413* (2013.01); *B01D 53/945* (2013.01); *B01J 23/30* (2013.01); *B01J 23/83* (2013.01); *B01J 23/888* (2013.01); *B01J 29/7415* (2013.01); *B01J 29/7815* (2013.01); *B01J 35/04* (2013.01); *B01J 37/0009* (2013.01); *C04B 35/50* (2013.01); *C04B 35/6365* (2013.01); *C04B 35/63488* (2013.01); *C04B 35/803* (2013.01); *C04B 35/82* (2013.01); *C04B 38/0006* (2013.01); *F01N 3/035* (2013.01); *B01D 53/9418* (2013.01); *B01D 2255/20738* (2013.01); *B01D 2255/20776* (2013.01); *B01D 2255/9155* (2013.01); *C04B 2111/0081* (2013.01); *C04B 2111/00793* (2013.01); *C04B 2235/322* (2013.01); *C04B 2235/3218* (2013.01); *C04B 2235/3229* (2013.01); *C04B 2235/606* (2013.01); *C04B 2235/6021* (2013.01); *Y02T 10/22* (2013.01); *Y02T 10/24* (2013.01); *Y10S 55/30* (2013.01); *Y10T 29/49345* (2015.01)

(58) Field of Classification Search
None
See application file for complete search history.

(56) References Cited

U.S. PATENT DOCUMENTS

| | | |
|---|---|---|
| 3,181,231 A | 5/1965 | Breck |
| 4,510,261 A | 4/1985 | Pereira et al. |
| 5,244,852 A | 9/1993 | Lachman et al. |
| 5,292,991 A | 3/1994 | Lachman et al. |
| 5,447,694 A | 9/1995 | Swaroop et al. |
| 5,552,128 A | 9/1996 | Chang et al. |
| 5,589,147 A | 12/1996 | Farnos et al. |
| 5,772,972 A | 6/1998 | Hepburn et al. |

(Continued)

FOREIGN PATENT DOCUMENTS

| | | |
|---|---|---|
| EP | 0 756 891 A1 | 2/1997 |
| EP | 0 801 972 A1 | 10/1997 |

(Continued)

OTHER PUBLICATIONS

Ido et al., "Fundamental Study and Possible Application of New Concept Honeycomb Substrate for Emission Control," *SAE Technical Paper Series*, Paper No. 2007-01-0658, Copyright © 2007 SAE International.

(Continued)

*Primary Examiner* — Melvin C Mayes
*Assistant Examiner* — Sheng H Davis
(74) *Attorney, Agent, or Firm* — RatnerPrestia (57) ABSTRACT

A wall-flow filter for filtering particulate matter from a flowing exhaust gas comprises a catalyst for catalyzing both the conversion of solid carbon in the particulate matter by oxygen and the selective reduction of oxides of nitrogen in the exhaust gas with a nitrogenous reductant, which catalyst comprising optionally stabilized ceria and at least one metal selected from (i) tungsten and (ii) both tungsten and iron.

18 Claims, 5 Drawing Sheets

(56) References Cited

U.S. PATENT DOCUMENTS

| | | | |
|---|---|---|---|
| 5,897,846 | A | 4/1999 | Kharas et al. |
| 6,110,862 | A | 8/2000 | Chen et al. |
| 6,248,684 | B1 | 6/2001 | Yavuz et al. |
| 6,432,859 | B1 | 8/2002 | Iwakuni et al. |
| 6,488,903 | B2 | 12/2002 | Mathes et al. |
| 6,555,081 | B2 | 4/2003 | Hori et al. |
| 6,569,392 | B1* | 5/2003 | Li et al. ............. 423/213.5 |
| 6,667,018 | B2 | 12/2003 | Noda et al. |
| 6,753,294 | B1* | 6/2004 | Brisley et al. ............. 502/439 |
| 6,780,805 | B2* | 8/2004 | Faber et al. ............. 502/66 |
| 7,507,684 | B2 | 3/2009 | Hofmann et al. |
| 7,883,678 | B2 | 2/2011 | Li et al. |
| 8,087,235 | B2 | 1/2012 | Strehlau et al. |
| 8,263,032 | B2 | 9/2012 | Andersen et al. |
| 8,529,853 | B2* | 9/2013 | Southward et al. ......... 423/213.2 |
| 2002/0051742 | A1* | 5/2002 | Hotta et al. ............. 423/213.5 |
| 2002/0077247 | A1 | 6/2002 | Bender et al. |
| 2002/0140138 | A1 | 10/2002 | Wu et al. |
| 2002/0183191 | A1 | 12/2002 | Faber et al. |
| 2003/0125194 | A1 | 7/2003 | Abe et al. |
| 2003/0224933 | A1* | 12/2003 | Kondo et al. ............. 502/439 |
| 2006/0179825 | A1 | 8/2006 | Hu et al. |
| 2007/0012028 | A1* | 1/2007 | Weissman et al. ............. 60/275 |
| 2007/0014710 | A1 | 1/2007 | Gerlach et al. |
| 2007/0134145 | A1 | 6/2007 | Strehlau et al. |
| 2007/0259770 | A1 | 11/2007 | Hofmann et al. |
| 2008/0069743 | A1 | 3/2008 | Castellano et al. |
| 2008/0182020 | A1* | 7/2008 | Eberle et al. ............. 427/231 |
| 2009/0143221 | A1* | 6/2009 | Ogunwumi et al. ............. 502/67 |
| 2009/0196813 | A1* | 8/2009 | Sobolevskiy et al. ......  423/239.2 |
| 2010/0034717 | A1 | 2/2010 | Adelmann et al. |
| 2010/0050604 | A1 | 3/2010 | Hoard et al. |
| 2010/0111789 | A1* | 5/2010 | Fajardie et al. ............. 423/213.2 |
| 2010/0222205 | A1* | 9/2010 | Ogunwumi et al. ............. 502/68 |
| 2010/0290963 | A1* | 11/2010 | Andersen et al. ......... 423/213.2 |
| 2010/0295218 | A1 | 11/2010 | Dotzel et al. |
| 2010/0296992 | A1* | 11/2010 | Jiang et al. ............. 423/239.2 |
| 2011/0021856 | A1 | 1/2011 | Lai et al. |
| 2011/0099975 | A1* | 5/2011 | Bailey et al. ............. 60/274 |
| 2011/0281720 | A1 | 11/2011 | Andersen et al. |

FOREIGN PATENT DOCUMENTS

| | | |
|---|---|---|
| EP | 1 338 322 A1 | 8/2003 |
| EP | 1 493 484 A1 | 1/2005 |
| EP | 1 739 066 A1 | 1/2007 |
| EP | 1 837 063 A1 | 9/2007 |
| EP | 2 105 589 A1 | 9/2009 |
| EP | 2 123 354 A1 | 11/2009 |
| EP | 2 130 589 A2 | 12/2009 |
| EP | 2 130 603 A2 | 12/2009 |
| EP | 2 130 605 A2 | 12/2009 |
| GB | 2 450 484 A | 12/2008 |
| JP | 63072342 * | 4/1988 |
| JP | 2004060494 | 2/2004 |
| JP | 2010-497 A | 1/2010 |
| JP | 2010-499 A | 1/2010 |
| WO | WO-99/47260 A1 | 9/1999 |
| WO | 2005016497 | 2/2005 |
| WO | WO-2006/093802 A2 | 9/2006 |
| WO | WO-2008/049491 A1 | 3/2008 |
| WO | WO-2008/132452 A2 | 11/2008 |
| WO | WO-2008/154739 A1 | 12/2008 |
| WO | WO-2009/001131 A1 | 12/2008 |
| WO | WO-2009/080155 A1 | 7/2009 |
| WO | WO-2009/093071 A1 | 7/2009 |
| WO | WO-2010/099288 A2 | 9/2010 |
| WO | WO-2010/099395 A1 | 9/2010 |
| WO | WO-2011/026573 A1 | 3/2011 |
| WO | WO-2011/080525 A1 | 7/2011 |

OTHER PUBLICATIONS

Howitt et al., "Cellular Ceramic Diesel Particulate Filter," *SAE Technical Paper Series*, Paper No. 810114, Copyright © 1981 Society of Automotive Engineers, Inc.

Heck et al., *Catalytic Air Pollution Control—Commercial Technology*, Second Edition, John Wiley & Sons, Inc., New York, 2002, Chapters 7 and 9, pp. 130-185 and 212-262.

International Search Report dated May 11, 2011, from PCT International Application No. PCT/GB2011/050170.

British Search Report dated May 25, 2011, from British Patent Application No. 1101730.8.

Li et al., "Application of zeolites as hydrocarbon traps in automotive emission controls," *Studies in Surface Science and Catalysis*, 2005, vol. 158, pp. 1375-1382.

U.S. Appl. No. 13/384,568, filed Jan. 17, 2012, Andersen et al.
U.S. Appl. No. 13/384,570, filed Jan. 17, 2012, Andersen et al.
U.S. Appl. No. 13/384,562, filed Jan. 17, 2012, Dotzel et al.
U.S. Appl. No. 13/384,564, filed Jan. 17, 2012, Dotzel et al.

* cited by examiner

FILTER COMPRISING COMBINED SOOT OXIDATION AND NH$_3$-SCR CATALYST

CROSS-REFERENCE TO RELATED APPLICATIONS

This application is the U.S. National Phase application of PCT International Application No. PCT/GB2011/050170, filed Feb. 1, 2011, and claims priority of U.S. Provisional Patent Application No. 61/300,279, filed Feb. 1, 2010, the disclosures of both of which are incorporated herein by reference in their entireties for all purposes.

FIELD OF THE INVENTION

The present invention relates to a filter for filtering particulate matter from an exhaust gas also containing oxides of nitrogen of an internal combustion engines from stationary source and mobile applications, which filter comprising a catalyst for converting oxides of nitrogen to N$_2$ using a nitrogenous reductant.

BACKGROUND OF THE INVENTION

EP 1739066 discloses a honeycomb structure comprising multiple honeycomb units having multiple through holes; and a seal layer that joins honeycomb units with each other via respective closed outer faces of the honeycomb units where the through holes are not open. The honeycomb unit includes at least inorganic particles, inorganic fibers and/or whiskers. The inorganic particles exemplified are alumina, titania, silica and zirconia; the inorganic fibres exemplified are silica alumina fibres; and the inorganic binders exemplified are silica sol, alumina sol, sepiolite and attapulgite. A catalyst component can be carried on the honeycomb structure. The catalyst component may include at least one type selected among noble metals including platinum, palladium and rhodium, alkali metals such as potassium and sodium, alkaline earth metal e.g. barium and oxides. The honeycomb structure can be used as a catalytic converter e.g. a three-way catalyst or a NO$_x$ storage catalyst for conversion of the exhaust gas of vehicles.

WO 2009/093071 discloses a wall-flow filter monolith substrate having a porosity of at least 40% formed from a selective catalytic reduction catalyst of extruded type.

U.S. Pat. No. 7,507,684 discloses an extruded monolithic catalytic converter for converting oxides of nitrogen in the presence of a reducing agent and a method of manufacturing such an extruded monolithic catalytic converter.

WO 2009/001131 discloses a method of converting nitrogen oxides in a gas stream to nitrogen comprising contacting the nitrogen oxides with a nitrogenous reducing agent in the presence of a non-zeolite base metal catalyst consisting of: (a) at least one transition metal dispersed on a mixed oxide or composite oxide or a mixture thereof as support material consisting of cerium and zirconium; or (b) cerium oxide and zirconium oxide as single oxides or a composite oxide thereof or a mixture of the single oxides and the composite oxide dispersed on an inert oxide support material, on which inert support material is also dispersed at least one transition metal.

U.S. Pat. No. 5,552,128 discloses a catalytic method for converting nitrogen oxides to nitrogen (i.e., N$_2$), which catalyst comprising an acidic solid component comprising a Group IVB metal oxide modified with an oxyanion of a Group VIB metal and further comprising at least one metal selected from the group consisting of Group IB, Group IVA, Group VB, Group VIIB, Group VIII, and mixtures thereof. A given example of this catalyst is zirconia, modified with tungstate, and iron. The method may be used for reducing emissions of nitrogen oxides from waste gases, including industrial exhaust gases and automobile exhaust gases. In a particular embodiment, nitrogen oxides in waste gases may be reacted with ammonia before the waste gases are discharged to the atmosphere.

SUMMARY OF THE INVENTION

We have now discovered very surprisingly that certain catalysts are active for catalysing both the NH$_3$—SCR reaction and the oxidation of carbon soot in oxygen. This discovery has particular application in treating exhaust gases from internal combustion engines. Such exhaust gases may result from stationary source emissions, but they have been developed for use in particular for treating mobile sources of emissions, such as passenger cars, trucks and buses.

According to one aspect, the invention provides a wall-flow filter for filtering particulate matter from a flowing exhaust gas, which filter comprising a catalyst for catalysing the conversion of solid carbon in the particulate matter by oxygen and for catalysing the selective reduction of oxides of nitrogen in the exhaust gas with a nitrogenous reductant, which catalyst comprising optionally stabilised ceria and at least one metal selected from (i) tungsten and (ii) both tungsten and iron.

BRIEF DESCRIPTION OF THE DRAWINGS

In order that the invention may be more fully understood, the following Examples are provided by way of illustration only and with reference to the accompanying drawings in which.

DETAILED DESCRIPTION OF THE INVENTION

In one embodiment, the catalyst is coated on an inert filter substrate.

In another embodiment, the catalyst comprises an extruded solid body comprising: 10-90% by weight of at least one binder/matrix component; and 5-80% by weight optionally stabilised ceria, wherein the at least one metal: (i) is present throughout the extruded solid body; (ii) is located in a majority at a surface of the extruded solid body; (iii) is present throughout the extruded solid body and is also present in a higher concentration at a surface of the extruded solid body; (iv) is present throughout the extruded solid body and is also carried in one or more coating layer(s) on a surface of the extruded solid body; or (v) is present throughout the extruded solid body, is present in a higher concentration at a surface of the extruded solid body and is also carried in one or more coating layer(s) on the surface of the extruded solid body.

An advantage of the present invention is that by removing catalytic components that are often used in catalytic coatings, the number of coatings can be reduced, e.g. from two layers to one layer; or a single layer can be removed altogether and catalytic metal can be supported on a surface of the extruded solid body as such. This has benefits in reducing backpressure in an exhaust system, increasing the efficiency of the engine.

Furthermore, by providing the possibility of uncoated catalysts, the extruded solid body can be manufactured at higher cell density, increasing strength and decreasing the thickness of cell walls which can improve light off performance and increasing activity through mass transfer.

Also it is possible to increase the volume of active components in an extruded solid body relative to a coating on an inert substrate monolith. For example, catalysts disclosed in our WO 2009/001131 disclosed above can be coated at about 2.7 g in$^{-3}$, whereas the equivalent material can be extruded as a solid body at 12 g in$^{-3}$. This increased catalyst density has advantages for long term durability and catalyst performance, which is important for on-board diagnostics.

"On board diagnostics" (OBD) in the context of a motor vehicle is a generic term to describe the self diagnostic and reporting capability of the vehicle's systems provided by a network of sensors linked to a suitable electronic management system. Early examples of OBD systems would simply illuminate a malfunction indicator light if a problem were detected, but it provided no information on the nature of the problem. More modern OBD systems use a standardised digital connection port and are capable of providing information on standardised diagnostic trouble codes and a selection of real-time data, which enable rapid problem identification and resolution of a vehicle's systems.

Current OBD requirements require that a driver must be notified in case of a malfunction or deterioration of the emission system that would cause emissions to exceed mandatory thresholds. So, for example, the OBD limits for Euro 4: 98/69/EC for passenger diesel vehicles (category M vehicles as defined by 70/156/EEC) are: carbon monoxide (CO)—3.2 g/km; hydrocarbons (HC)—0.4 g/km; nitrogen oxides ($NO_x$)—1.2 g/km; and particulate matter (PM) 0.18 g/km. For passenger petrol (gasoline) vehicles, the Euro 4 limits are: CO—3.2 g/km; HC—0.4 g/km; $NO_x$—0.6 g/km; and PM—no limit.

Future vehicular emissions legislation, especially in US and Europe, requires higher sensitivity in diagnostic function so as continuously to monitor the ability of an exhaust system aftertreatment catalyst to meet the emission legislation. For example, the current draft OBD limits for Euro 5: 715/2007/EC for compression ignition (diesel) passenger vehicles are: CO—1.9 g/km; non-methane hydrocarbons (NMHC) 0.25 g/km; $NO_x$—0.54 g/km; PM—0.05 g/km; and for positive ignition (gasoline) passenger vehicles: CO—1.9 g/km; NMHC—0.25 g/km; $NO_x$—0.54 g/km; and PM—no limit.

In US it is understood that the OBD II legislation (Title 13, California Code Regulations, Section 1968.2, Malfunction and Diagnostic System Requirements for 2004 and Subsequent Model-Year Passenger Cars, Light-Duty Trucks and Medium-Duty Vehicles and Engines) for catalyst monitoring of gasoline/spark ignited engines requires a malfunction signal where the average Federal Test Procedure (FTP) test for NMHC conversion efficiency of a monitored portion of a catalyst system falls below 50%.

Extruded solid bodies according to the present invention generally comprise a unitary structure in the form of a honeycomb having uniform-sized and parallel channels extending from a first end to a second end thereof. Channels at a first, upstream end can be blocked e.g. with a suitable ceramic cement, and channels not blocked at the first, upstream end can also be blocked at a second, downstream end to form a so-called wall-flow filter. Typically, the arrangement of the blocked channels at the first, upstream end resembles a checker board with a similar arrangement of blocked and open downstream channel ends. Channel walls defining the channels are porous. Typically an external "skin" surrounds a plurality of the channels of the extruded solid body. The extruded solid body can be formed from any desired cross section, such as circular, square or oval. Individual channels in the plurality of channels can be square, triangular, hexagonal, circular etc.

It is clear that the honeycomb structure disclosed in EP 1739066 has a Thermal Shock Parameter (TSP) too low to be used in a single unitary extrudate, because the honeycomb structure comprises an assembly of individual honeycomb units cemented together. This, arrangement, also seen in commercially available silicon carbide honeycombs, is designed to avoid catastrophic catalyst substrate failure due to inter alia thermal shock as a result of a relatively high Coefficient of Thermal Expansion (CTE) of the extruded material. However, the manufacture of a honeycomb structure from individual honeycomb units is complicated, laborious, time consuming and expensive and increases the number of possible physical failure modes, e.g. at the cement bonds, compared with a single piece extrusion. A more complete explanation of TSP and CTE can be found in "Catalytic Air Pollution Control—Commercial Technology", Second Edition, R. M. Heck et al., John Wiley & Sons, Inc., New York, 2002, Chapters 7 (in relation to flow-through monoliths) and 9 (for wall-flow filters).

Accordingly, we prefer that the extruded solid body of the catalyst according to the invention has an axial Thermal Shock Parameter (TSP) and a radial TSP sufficient to avoid radial cracks and ring cracks in the extruded solid body when used for treating exhaust gases from a stationary or mobile source of emissions. In this way the extruded solid body can be formed from a single unitary extrudate. For extruded solid bodies having a particularly large cross-section, it may still be necessary to extrude segments of the extruded solid body for cementing together. However, this is because of difficulties in processing extrudates of such a large cross section, or because of limitations in the size of the extrudate die tooling. Taken individually, however, each segment of the whole catalyst would meet the functional limitation that the axial TSP and the radial TSP are sufficient to avoid radial cracks and ring cracks in the individual extruded solid body segments when used for treating exhaust gases from a stationary or mobile source of emissions. In one embodiment the radial TSP is >0.4 at 750° C., such as >0.5, >0.6, >0.7, >0.8>0.9 or >1.0. At 800° C., the radial TSP is desirably also >0.4 and at 1000° C. is preferably >0.8.

The CTE of wall-flow filters is preferably $20 \times 10^{-7}$/° C. in order to be formed from a one-piece extrudate.

In embodiments, the at least one binder/matrix component can be selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof.

Spinels can be $MgAl_2O_4$ or the Mg can be partially replaced by a metal from the group consisting of Co, Zr, Zn or Mn.

The alumina binder/matrix component is preferably gamma alumina, but can be any other transition alumina, i.e. alpha alumina, beta alumina, chi alumina, eta alumina, rho alumina, kappa alumina, theta alumina, delta alumina, lanthanum beta alumina and mixtures of any two or more such transition aluminas.

It is preferred that the alumina is doped with at least one non-aluminium element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Sources of silica can include a silica, a silica sol, quartz, fused or amorphous silica, sodium silicate, an amorphous aluminosilicate, an alkoxysilane, a silicone resin binder such as methylphenyl silicone resin, a clay, talc or a mixture of any two or more thereof.

Of this list, the silica can be $SiO_2$ as such, feldspar, mullite, silica-alumina, silica-magnesia, silica-zirconia, silica-thoria, silica-berylia, silica-titania, ternary silica-alumina-zirconia, ternary silica-alumina-magnesia, ternary-silica-magnesia-zirconia, ternary silica-alumina-thoria and mixtures of any two or more thereof. Alternatively, the silica can be derived from calcining tetramethyl ortho silicate (TMOS) added to the extrusion composition.

Suitable clays include fullers earth, sepiolite, hectorite, a smectite, a kaolin and mixtures of any two or more thereof, wherein the kaolin can be chosen from subbentonite, anauxite, halloysite, kaolinite, dickite, nacrite and mixtures of any two of more thereof; the smectite can be selected from the group consisting of montmorillonite, nontronite, vermiculite, saponite and mixtures of any two or more thereof; and the fullers earth can be montmorillonite or palygorskite (attapulgite).

Inorganic fibres are selected from the group consisting of carbon fibres, glass fibres, metal fibres, boron fibres, alumina fibres, silica fibres, silica-alumina fibres, silicon carbide fibres, potassium titanate fibres, aluminum borate fibres and ceramic fibres.

The ceria component can be optionally stabilised with at least one non-cerium element to increase the thermal stability of the ceria. Suitable ceria stabilisers include zirconium, lanthanides and mixtures of any two or more thereof. Lanthanide stabilisers include La, Nd, Pr, Gd and mixtures of any two or more thereof. The $CeO_2:ZrO_2$ ratio by weight can be e.g. between 80:20 or 20:80. Commercially available materials include 30% by weight $CeO_2$, 63% $ZrO_2$, 5% $Nd_2O_3$, 2% $La_2O_3$; and 40% $CeO_2$, 50% $ZrO_2$, 4% $La_2O_3$, 4% $Nd_2O_3$ and 2% $Y_2O_3$.

Broadly, the at least one metal can be: (a) present throughout the extruded solid body, i.e. the at least one metal is present in the extrudate composition; (b) present in a higher concentration at a surface of the extruded solid body; and/or (c) carried in one or more coating layer(s) on a surface of the extruded solid body in features (iii), (iv) and (v). So the at least one metal can be present at location (a), (b), (c), (a) plus (b), (a) plus (c) or (a) plus (b) plus (c). Where the at least one metal is present in (a) and (b), (a) and (c) or (a), (b) and (c), the at least one metal in each location can be the same or different.

The at least one metal present: throughout the extruded solid body but not associated with the or each molecular sieve; in the majority of the at least one metal located at the surface of the extruded solid body; in one or more coating layer(s) on the surface of the extruded solid body; or in the higher concentration at the surface of the extruded solid body can be selected from the group consisting of an alkali metal, an alkaline earth metal, a transition metal, a lanthanide or a mixture of any two or more thereof.

Suitable coatings for supporting catalytic metals for use in the present invention include one or more of alumina ($Al_2O_3$), particularly γ-alumina, silica ($SiO_2$), titania ($TiO_2$), ceria ($CeO_2$), zirconia ($ZrO_2$), vanadia ($V_2O_5$), lanthana ($La_2O_3$) and zeolites. The ceria and alumina can be optionally stabilised using the same stabilisers as used for the extruded solid body.

Techniques for locating at least one metal in higher concentration at the surface of the extruded solid body include impregnation, preferably thickened impregnation, i.e. an impregnation medium thickened with a rheology modifier. Drying methods can also be used to concentrate metals at a surface of the extruded solid body. For example, a so-called "egg shell" technique, where metals are concentrated at the surface can be obtained by drying the impregnated extruded solid body relatively slowly so that the metals are deposited at the surface by wicking. Particular choices of salts and pH conditions can also be used to direct metal deposition, e.g. by determining the isoelectric point of the extruded solid body and then using the correct combination of pH and metal salts to benefit from an electrostatic attraction between cations or anions in the metal salts and the extruded solid body.

The total metal content throughout the extruded solid body but not associated with the or each molecular sieve component; located at the surface of the extruded solid body; and/or in the higher concentration at the surface of the extruded solid body can be from 0.1 to 20% by weight, such as from 1 to 9% by weight.

The total metal content of the extruded solid body, i.e. including any metal associated with the or each molecular sieve, can be from 0.1 to 25% by weight, such as from 1 to 15% by weight.

The total metal content of the catalyst as a whole, including one or more coating layer(s) on a surface of the extruded solid body comprises at least one metal, can be from 0.1 to 30% by weight, such as from 1 to 25% by weight.

In specific examples, the wall-flow filter according to the invention comprises an extruded solid body comprising:
10-90% by weight of a cordierite, nitrides, carbides, borides, intermetallics, lithium aluminosilicate, an optionally doped alumina, a silica source, titania, zirconia, titania-zirconia, zircon and mixtures of any two or more thereof;
0-80% by weight of spinel;
5-80% by weight optionally stabilised ceria; and
0-25% by weight inorganic fibres.

The content of the at least one binder/matrix component can be >15% by weight, >20% by weight, >30% by weight, >35% by weight, >40% by weight, >45% by weight, >50% by weight, >55% by weight, >60% by weight, >65% by weight or >70% by weight, >75% by weight, >80% by weight or >85% by weight.

The content of the spinel can be >10% by weight, >15% by weight, >20% by weight, >30% by weight, >35% by weight, >40% by weight, >45% by weight, >50% by weight, >55% by weight, >60% by weight, >65% by weight or >70% by weight.

The content of the optionally stabilised ceria can be >10% by weight, >15% by weight, >20% by weight, >30% by weight, >35% by weight, >40% by weight, >45% by weight, >50% by weight, >55% by weight, >60% by weight, >65% by weight or >70% by weight.

The content of the inorganic fibres can be >5% by weight, >10% by weight, >15% by weight or >20% by weight.

In an embodiment the extruded solid body can consist essentially of: 10-80% by weight of cordierite, nitrides, carbides, borides, intermetallics, lithium aluminosilicate, an optionally doped alumina, a spinel, a silica source, titania, zirconia, titania-zirconia, zircon and mixtures of any two or more thereof; 20-80% by weight optionally stabilised ceria; and 0-25% by weight of inorganic fibres. Preferred embodiments contain inorganic fibres.

In a particularly preferred embodiment, the extruded solid body consists essentially of: 10-80% by weight of cordierite, nitrides, carbides, borides, intermetallics, lithium aluminosilicate, an optionally doped alumina, titania, zirconia, titania-zirconia, zircon and mixtures of any two or more thereof; 0-20% by weight of a source of silica; 0-50% by weight of magnesium aluminate spinel; 20-80% by weight optionally stabilised ceria; and 0-20% by weight inorganic fibres. Preferred embodiments may contain magnesium aluminate spinel and inorganic fibres.

In parallel research aimed at developing extruded solid bodies for use in $NO_x$ trap, we have encountered a lack of strength in the extruded solid body in the composition: 69% by weight of $CeO_2$, and 23% by weight of $\gamma$-$Al_2O_3$ and 8% by weight glass fibres. Current proposals for increasing strength include pre-calcining the $CeO_2$ material to reduce surface loss during calcinations of the "green" extruded solid body; increasing the alumina content to 50%+; changing the particle size of the alumina (e.g. from commercially available Pural™ to Disperal™) and/or the optionally stabilised ceria; adding an inert binder to increase mechanical stability e.g. a clay; use a different alumina e.g. an alumina sol; testing other binder systems e.g. $TiO_2$ sols, $CeO_2$ sols; cerium acetate; zirconium acetate; optimising the pH; and adding surface modifiers e.g. aluminium salts or other organic surfactants. In preliminary tests we have found that the presence of silica can affect $NO_x$ trap performance. However, research is continuing and this option will be further investigated. However, in one embodiment the content of a source of silica will be reduced or removed altogether.

In a further embodiment, the extruded solid body consists essentially of: 10-50% by weight of cordierite, nitrides, carbides, borides, intermetallics, lithium aluminosilicate, an optionally doped alumina, titania, zirconia, titania-zirconia, zircon and mixtures of any two or more thereof; 0-10% by weight of a source of silica; 20-50% by weight of magnesium aluminate; 20-70% by weight optionally stabilised ceria; and 0-10% by weight inorganic fibres.

Where any of the above extruded solid bodies are made into a wall-flow filter, the porosity of the wall-flow filter can be from 30-80%, such as from 40-70%.

In a more specific example according to the present invention, a wall-flow filter for converting oxides of nitrogen in the presence of a reducing agent and for combusting particulate matter comprises an extruded solid catalyst body consists essentially of: 10-80% by weight of cordierite, nitrides, carbides, borides, intermetallics, lithium aluminosilicate, a spinel, an optionally doped alumina, titania, zirconia, titania-zirconia, zircon and mixtures of any two or more thereof; 0-30% by weight of a source of silica; 20-80% by weight optionally stabilised ceria; and 0-20% by weight inorganic fibres, which extruded solid catalyst body being impregnated with tungsten, iron or tungsten and iron.

An advantage of the present invention is that the tungsten-based active catalytic component promotes both the reduction of oxides of nitrogen using a nitrogenous reductant (e.g. $NH_3$-selective catalytic reduction ($NH_3$—SCR)); and the combustion of soot by lowering the temperature for the ignition of the carbon/oxygen (C—$O_2$) reaction.

WO 2009/001131 describes that composite catalysts containing Fe—W/$CeO_2$—$ZrO_2$ to be active and selective for $NH_3$ SCR. These catalysts can be formed by dispersing Fe and W on $Ce_xZr_{1-x}O_2$ (X=0.1-0.9) oxides preferably as mixed oxides in solid solutions. We have now developed a modification of the Fe—W/$CeO_2$—$ZrO_2$ catalyst to enable it to perform $NH_3$—SCR, whilst lowering the ignition temperature of the C—$O_2$ reaction. We have confirmed that $Ce_xZr_{1-x}O_2$ (X=0.1-1.0) is active for promoting the C—$O_2$ reaction, and by doping these materials with W their activities for the SCR reaction is enhanced. Accordingly this invention embraces a series of $WO_3$—$CeO_2$—$ZrO_2$ systems with the ability to perform both the $NO_x$ reduction reaction with a nitrogenous reductant and soot oxidation reaction with $O_2$. The W and Zr loading on these materials can be optimized to achieve this dual functionality. It will be understood that the benefit of this particular invention extends to catalyst coatings applied to inert filter substrates, such as ceramic wall-flow filters.

According to a further aspect, the invention provides an exhaust system for a vehicle, which system comprising a source of nitrogenous reductant, injector means for injecting the nitrogenous reductant into a flowing exhaust gas and a wall-flow filter according to any preceding claim disposed downstream of the injector means.

In a preferred embodiment, the exhaust system comprises an oxidation catalyst disposed upstream of the injector means for oxidising nitric oxide to nitrogen dioxide.

In another aspect according to the invention there is provided a vehicle, e.g. an automobile, comprising an internal combustion engine and an exhaust system according to the invention.

The internal combustion engine can be a compression ignition engine or a positive ignition engine. A positive ignition engine is typically fuelled with gasoline fuel, but other fuels can be used including gasoline fuel blended with oxygenates including methanol and/or ethanol, liquid petroleum gas or compressed natural gas. Compression ignition engines can be fuelled by diesel fuel, blends of diesel fuel and biodiesel or Fischer-Tropsch derived fuels, biodiesel as such or natural gas as such. Modern compression ignition engines including those known as the Dilution Controlled Combustion System (DCCS), for example Toyota's Smoke-less Rich Combustion concept. Emissions from Homogeneous Charge Compression Ignition (HCCI) engines may also be treated. In particular, modern engines wherein substantially all fuel for combustion is injected into a combustion chamber prior to the start of combustion may be treated. In a preferred embodiment, the internal combustion engine is a compression ignition engine.

According to a further aspect, the invention provides a process of manufacturing a wall-flow filter according to the invention, which process comprising the steps of: forming a solid extruded body by mixing powdered starting materials of: at least one binder/matrix component or a precursor of one or more thereof; an optionally stabilised ceria; and an optional salt of tungsten and/or iron; with optional inorganic fibres; optionally adding an organic auxiliary agent; processing by mixing and/or kneading in an acid or alkaline aqueous solution to form a mixture; extruding the mixture into a catalyst body, drying the catalyst body and calcining to form a solid extruded body; and selecting quantitative proportions of the starting materials such that the solid extruded body contains 10-90% by weight of at least one binder/matrix component; and 5-80% by weight optionally stabilised ceria, and optionally impregnating a surface of the solid extruded body with at least one of tungsten and iron and/or optionally coating a surface of the solid extruded body with at least one coating layer(s) containing at least one of tungsten and iron.

Very generally, the production of an extruded solid body, a binder, an organic viscosity-enhancing compound and a liquid for converting the material by blending into an homogeneous paste are added to the binder/matrix component or a precursor thereof and optional molecular sieve, optional optionally stabilised ceria, optional inorganic fibres and optional at least one metal compound, and the mixture is compacted in a mixing or kneading apparatus or an extruder. The mixtures have organic additives such as binders, plasticizers, surfactants, lubricants, dispersants as processing aids to enhance wetting and therefore produce a uniform batch. The resulting plastic material is then moulded, in particular using an extrusion press or an extruder including an extrusion die, and the resulting mouldings are dried and calcined. The organic additives are "burnt out" during calcinations of the extruded solid body.

The at least one binder/matrix component is selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. An alumina precursor can be used which is aluminium hydroxide or boehmite. Where an aluminium oxide is used, to ensure the binding with the aluminium oxide, it is advantageous to add an aqueous solution of a water-soluble metal salt to the aluminium oxide or the precursor substance of the aluminium oxide before adding the other starting materials.

In embodiments, the silica source can be selected from the group consisting of a silica, a silica sol, quartz, fused or amorphous silica, sodium silicate, an amorphous aluminosilicate, an alkoxysilane, a silicone resin binder, a clay, talc or a mixture of any two or more thereof.

In a particular embodiment, the silica source is a silicone resin binder and a solvent for the silicone resin binder is isopropyl alcohol or a dibasic ester.

The organic auxiliary agent for use in the process according to the present invention can be one or more selected from the group consisting of a cellulose derivative, an organic plasticizer, a lubricant and a water-soluble resin. Examples of suitable cellulose derivatives include cellulose ethers selected from the group consisting of methylcellulose, ethylcellulose, carboxymethylcellulose, ethylhydroxyethylcellulose, hydroxyethylcellulose, hydroxypropylcellulose, methylhydroxyethylcellulose, methylhydroxypropylcellulose and combinations of any two or more thereof. Cellulose derivatives increase the porosity of the final product, which is advantageous for the catalytic activity of the solid catalyst body. Initially the cellulose swells in the aqueous suspension but is ultimately removed during the calcining process.

The organic plasticizer for use in the process of the present invention is selected from the group consisting of polyvinyl alcohol, polyvinyl butyral, an ionomer, acrylics, copolyethylene/acrylic acid, polyurethane, a thermoplastic elastomers, a relatively low molecular weight polyester, linseed oil, a ricinoleate and combinations of any two or more thereof.

The water-soluble resin can be a polyacrylate.

The lubricant for use in the process according to the present invention is selected from at least one of the group consisting of ethylene glycol, stearic acid, sodium stearate, glycerine and glycols.

Depending on the composition of the extrudate composition, the pH can be acid or alkaline. Where the process uses an acidic aqueous solution, the pH-value of the solution can be between 3 and 4. Desirably, acetic acid is used to acidify the solution.

Where the process uses an alkaline aqueous solution, the pH-value of the solution can be between 8 and 9. Ammonia can be used to adjust the pH to the alkaline side.

EXAMPLES

Example 1

Experiments Using Powdered $WO_3$—$CeO_2$—$ZRO_2$ Catalysts

Powdered commercially available 50:50 $CeO_2$—$ZrO_2$ was impregnated with a solution of ammonium metatungstate $((NH_4)_6W_{12}O^{39}xH_2O)$ at concentrations sufficient to obtain 5 wt % W and 15 wt % tungsten on the $CeO_2$—$ZrO_2$ material. The impregnated samples were then dried and calcined.

Diesel soot was collected using an uncatalysed wallflow filter fitted to a bench-mounted 2.4 liter diesel Euro IV calibrated engine fuelled with 50 ppm diesel available from any UK fuel station, which engine being run over a drive cycle known to produce significant quantities of soot. The collected soot was removed from the filter using compressed air.

A physical mixture of the collected diesel soot and 5 wt % W—$CeO_2$—$ZrO_2$ or 15 wt % W—$CeO_2$—$ZrO_2$ was investigated using temperature-programmed oxidation (TPO)— a technique for the characterization of solid materials to find the most efficient oxidation conditions in a gas mixture consisting of 5% $O_2$, He balance gas mixture flowing over the sample. The soot ignition temperature is measured by the $CO_2$ formation.

Figure 1:
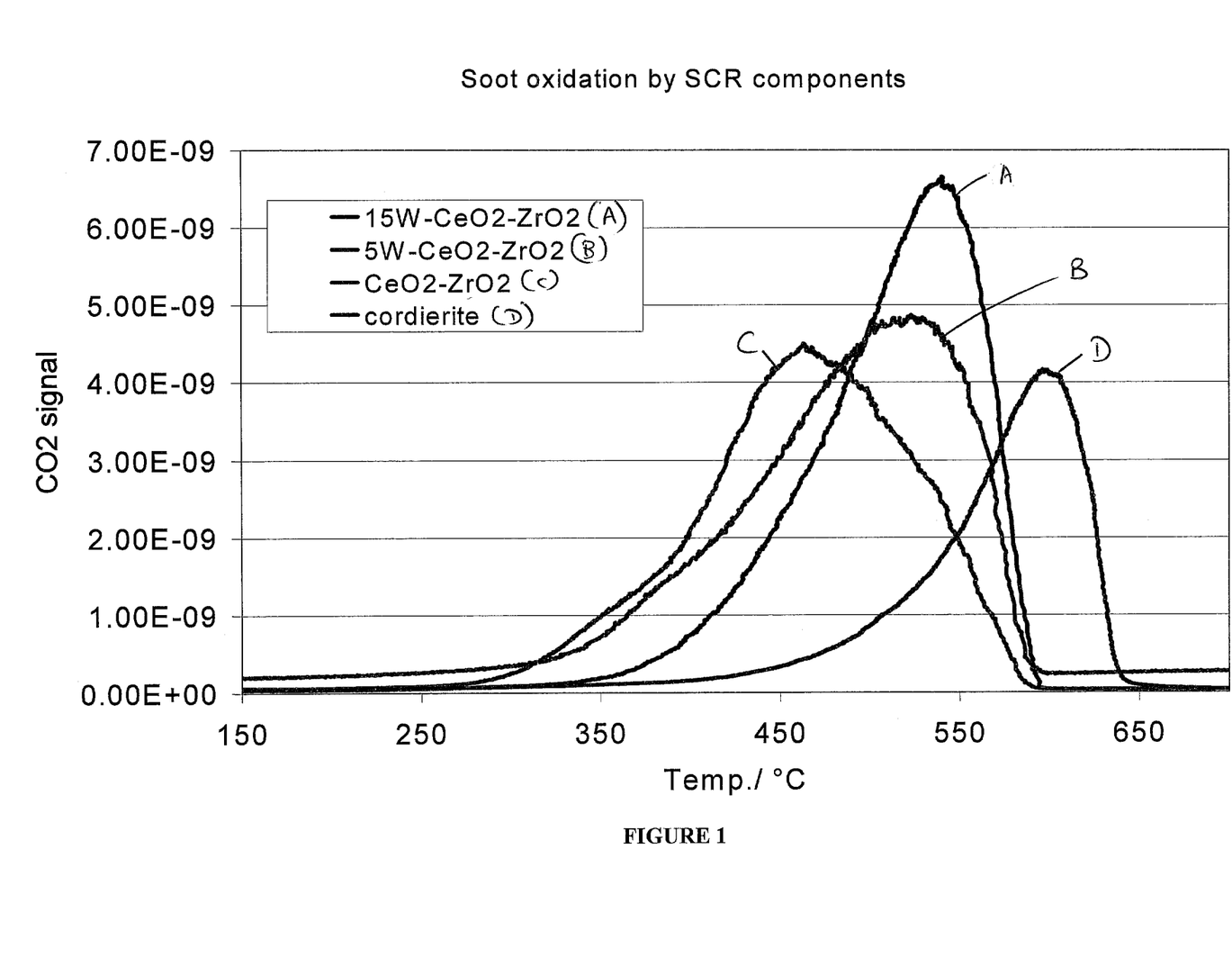
FIG. 1 is a graph showing the effect of tungsten concentration on the oxidation of soot in a physical mixture of the soot and catalyst in a temperature programmed oxidation experiment whereby the catalyst mixture is ramped in a gas mixture containing 5% O$_2$ and He balance.

FIG. 1 shows the effect of W concentration on the oxidation of soot in a physical mixture of the soot and catalyst with $CeO_2$—$ZrO_2$ without tungsten and powdered cordierite (obtained by crushing a commercially available cordierite flow-through substrate) as controls. It can be seen that the $Ce_x Zr O_2$ (X=0.5) promotes the oxidation of soot and the ignition temperature is decreased from T~600 C in absence of the catalyst to T~450 C. The presence of W lowers the reactivity slightly.

Figure 2:
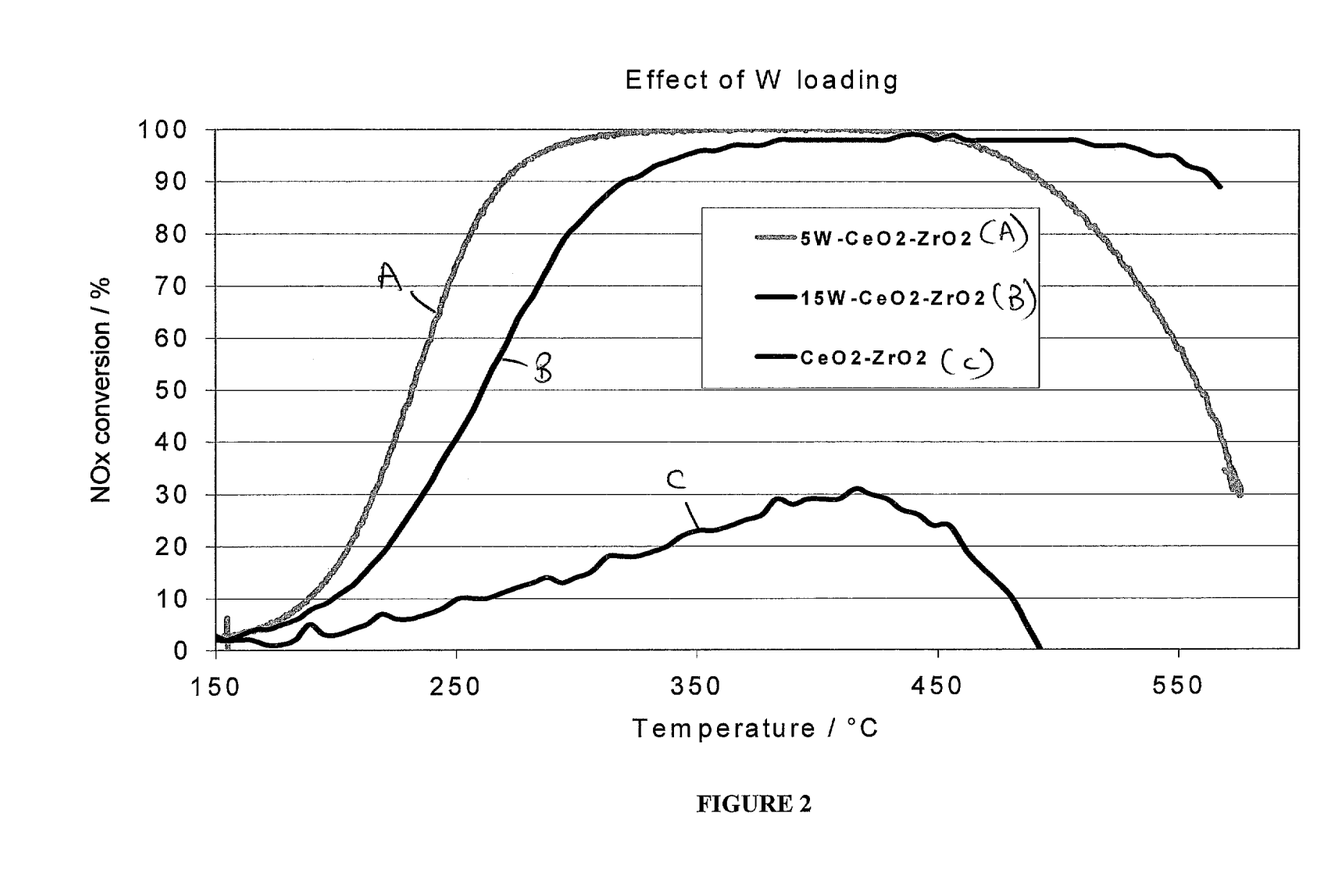
FIG. 2 is a graph showing NH$_3$—SCR activity of W—CeO$_2$—ZrO$_2$.

Powdered samples of 5 wt % W—$CeO_2$—$ZrO_2$, 10 wt % W—$CeO_2$—$ZrO_2$ or 15 wt % W—$CeO_2$—$ZrO_2$, $CeO_2$—$ZrO_2$ and 10 wt % W—$CeO_2$ (X=1.0) were screened for $NH_3$ SCR activity on a laboratory synthetic catalytic activity test (SCAT) apparatus using a gas mixture containing 500 ppm NO, 500 ppm $NH_3$, 5% $CO_2$, 5% $H_2O$, 10% $O_2$ and 300 ppm CO. As can be seen in FIG. 2, although the $CeO_2$—$ZrO_2$ without tungsten present was inactive and unselective for reacting $NO_x$ with $NH_3$, the W—$CeO_2$—$ZrO_2$ catalysts show high reactivity for the $NH_3$—SCR reaction. It can also be seen that the catalyst containing 5 wt % W is more active at relatively lower temperatures than the 15 wt % W catalyst, whereas the 15 wt % W-containing catalyst retains activity at higher temperatures. Depending on the prevailing temperature of the exhaust gas, the appropriate catalyst can be selected.

Figure 3:
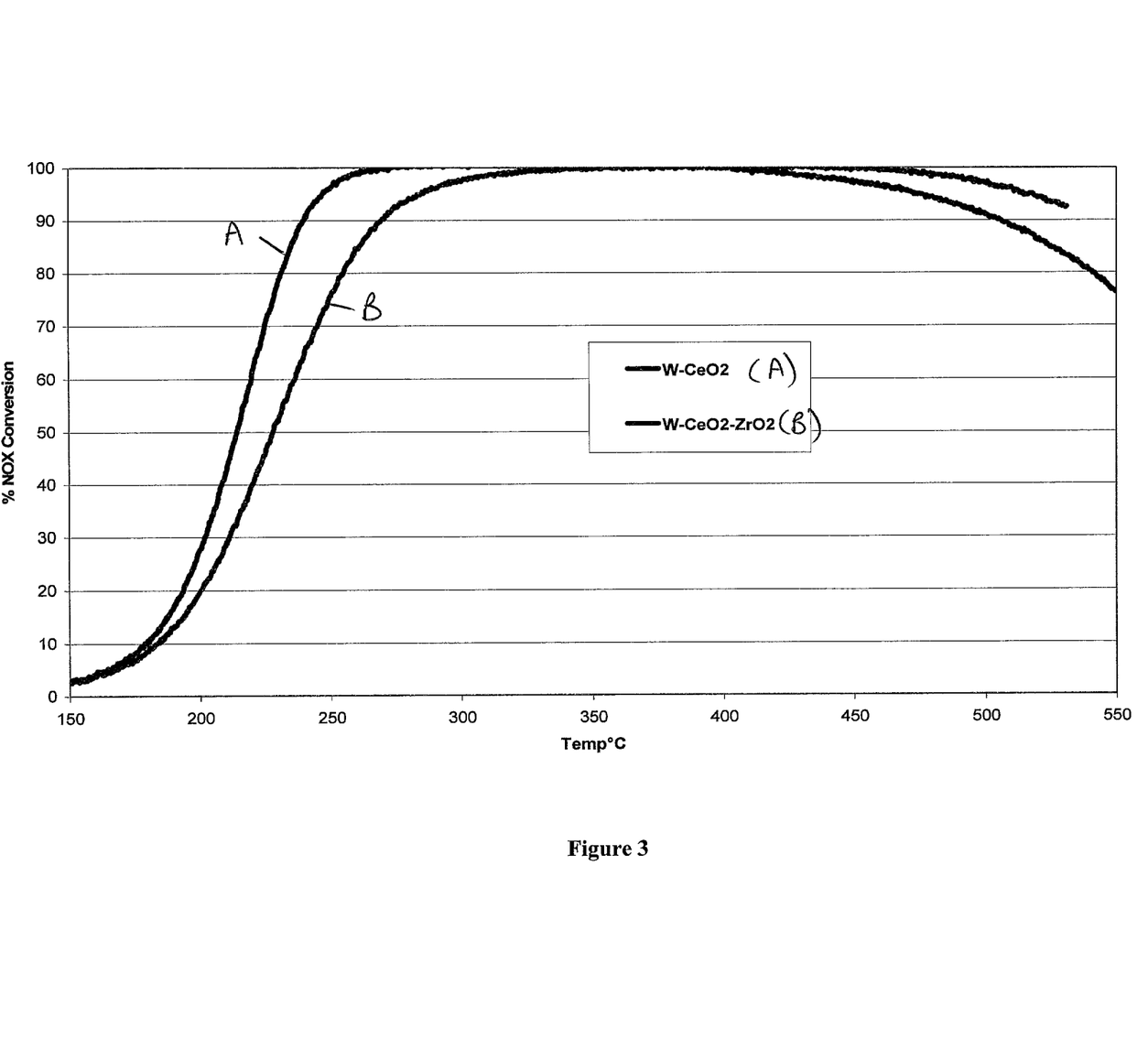
FIG. 3 is a graph showing the activity of 10 wt % W—CeO$_2$ and 10 wt % W—CeO$_2$—ZrO$_2$.

FIG. 3 compares 10 wt % W—$CeO_2$—$ZrO_2$ and 10 wt % W—$CeO_2$ and shows that both materials are active for $NH_3$—SCR.

Example 2

Extruded $V_2O_5$/$WO_x$—$TiO_2$ Filter

A Reference extruded $V_2O_5$/$WO_x$—$TiO_2$ solid body was prepared similarly to Examples 1 and 5 by blending components A, B, F and S as set out in Table 1 with water to make a kneadable paste. Additives H (pore modifiers) were added and the material was kneaded for 10 mins to disperse the pore modifiers. The resulting composition was extruded, dried and calcined as described in Examples 1 and 5. It should be noted that the percentage quantities of inorganic solids present in the final calcined article is 100%. Quantities of additives (here H and S) that are removed by combustion during calcination are provided in wt % relative to the 100% inorganic solids content.

TABLE 1

| Active Components | | Binder | | | Stabilizer | Extrusion Additive | | | Additional Additives | | |
|---|---|---|---|---|---|---|---|---|---|---|---|
| A1 | A2 | B1 | B2 | B3 | F1 | H1 | H2 | H3 | S1 | S2 | S3 |
| 82.90 | 1.70 | 3.00 | 3.00 | 1.40 | 8.00 | 1.00 | 1.00 | 0.30 | 1.76 | 9.20 | 0.56 |

A1 = TiW (98.9%) MC 10/Cristal)
A2 = $V_2O_5$ from AMV (78% $V_2O_5$, GFE)
B1 = Bentonite (90%, ACE/Mizuka)
B2 = Kaolin (97.9% TK0177/Novus)
B3 = $SiO_2$ (100%, Tixosil/Novus)
F1 = Glass fibers (Vetrotex 4.5 mm/Saint Gobain)
H1 = Cellulose (QP10000H/Nordmann)
H2 = PEO (Alkox/Alroko)
H3 = Zusoplast (Zschimmer&Schwarz)
S1 = MEA (Imhoff & Stahl)
S2 = $NH_3$
S3 = $C_3H_6O_3$ (Fauth)

The following pore modifiers were used instead of the Extrusion Additives H1, H2 and H3 in Table 1, with amounts shown being relative to the total weight of inorganic solid in the recipe of Table 1.

TABLE 2

| Pore Modifier | Wt % Used in Table 1 Recipe | Pore Volume ($mm^3$/g) | Pore Radius (Å) | Porosity (%) |
|---|---|---|---|---|
| Reference | See Table 1 | 310.1 | 1783.6 | 39.8 |
| Cellulose CMC-QP10000H (Nordmann) | 20 | | | |
| BC200 (Kremer Pigmente GmbH & Co. KG) | 13 | | | |
| PAN Fibres | 13 | | | |
| Recycling | 9 | 333.6 | 1930.9 | 41.2 |
| Arbocel (Schwarzwälder Textil-Werke) | 10 | 427 | 2950 | 47.2 |
| HOP Fibre (Osthoff-Petrasch GmbH) | 10 | 426 | 2629 | 48.8 |
| Arbocel (Schwarzwälder Textil-Werke) | 15 | 524 | 5281 | 50.2 |
| HOP Fibre (Osthoff-Petrasch GmbH) | 15 | 543 | 3085 | 54.4 |

Porosity and pore volume and pore radius can be measured e.g. using mercury intrusion porosimetry.

Figure 4:
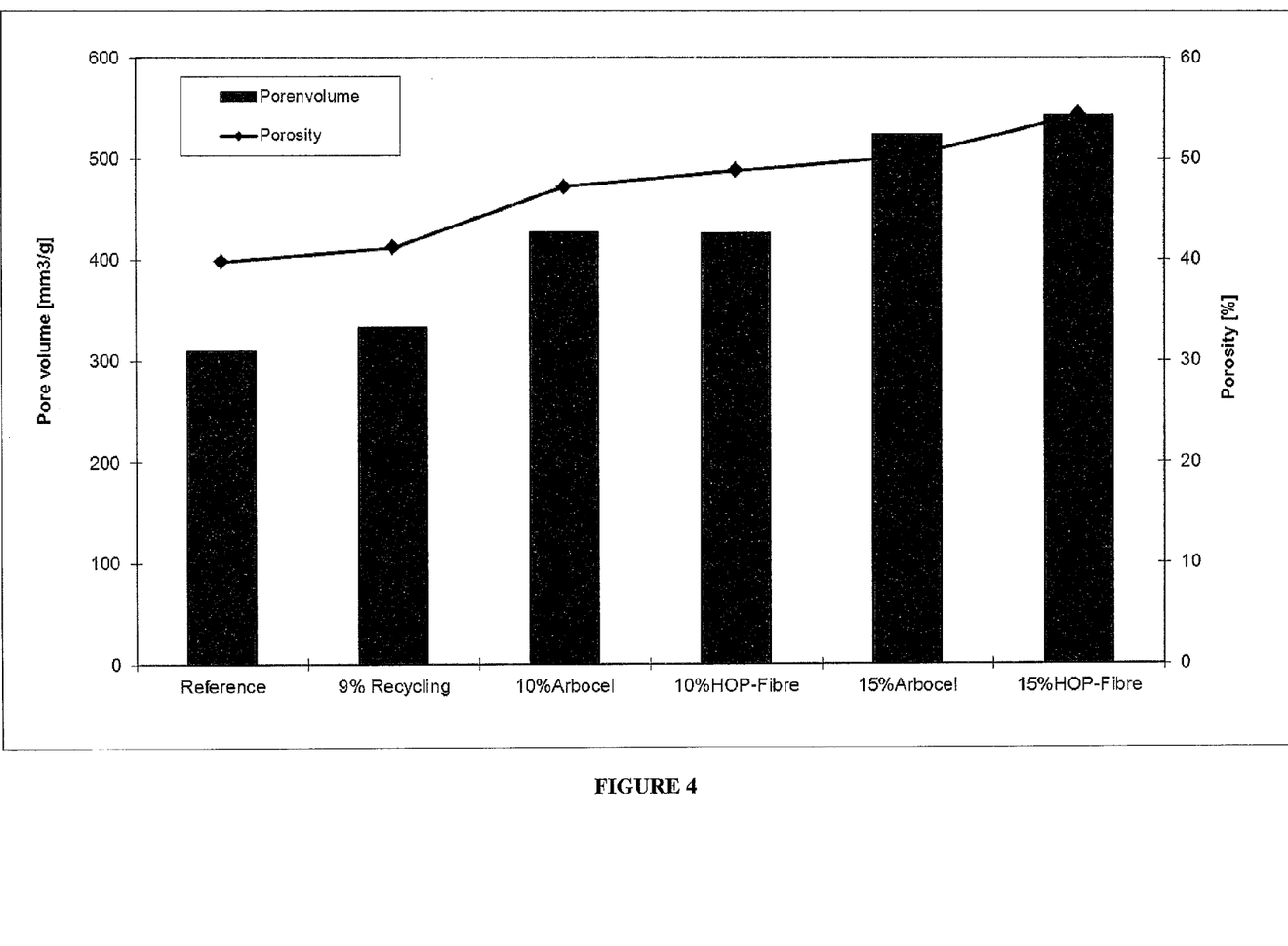
FIG. 4 is a graph comparing the pore volume and porosity of various V$_2$O$_5$/WO$_x$—TiO$_2$ filter materials prepared using various pore modifiers relative to a Reference product used in a flow-through configuration.

The results of Table 2 entries including pore volume and porosity are also represented in FIG. 4. It can be seen from these results that the porosity and pore volume of the Reference can be increased by appropriate selection of pore modifiers so that an extruded solid body made using such pore modifiers may be used in the manufacture of wall-flow filters.

These results are generic for increasing the porosity, pore volume etc. properties independent of the active components of the solid extruded body. That is, although increasing porosity and pore volume etc. of this Example 6 are illustrated using $V_2O_5$/$WO_x$—$TiO_2$ active materials, the principles of increasing porosity and pore volume etc. disclosed in this Example 6 are applicable to the extrusion of any active material, e.g. an extruded solid body for use in a gasoline soot filter comprising a three-way catalyst, because the pore modifiers are burnt out in the calcination process leaving the active materials and fillers etc. behind as inorganic solids.

Figure 5:
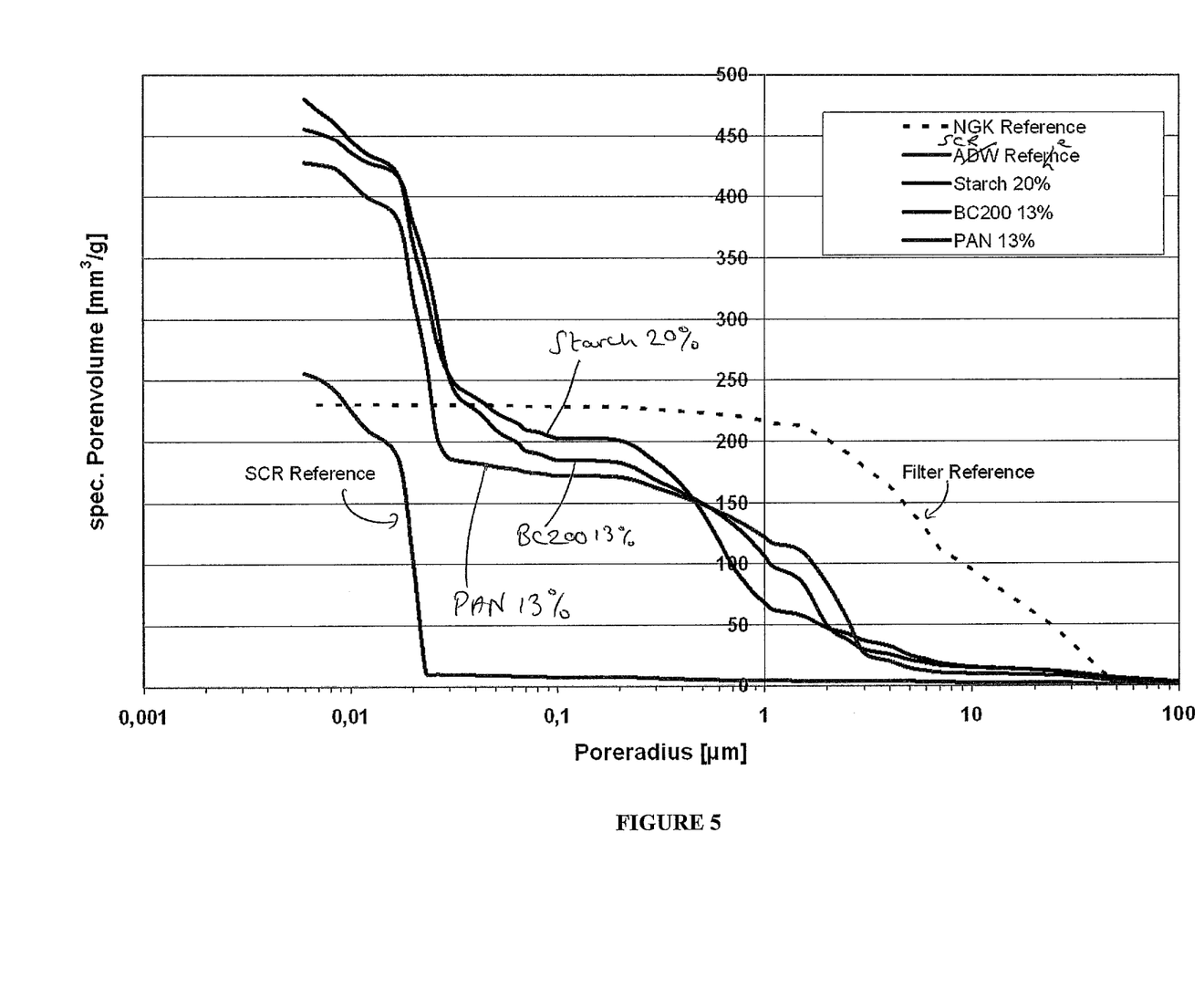
FIG. 5 is a graph plotting the pore volume against pore radius for a number of pore modifiers relative to the V$_2$O$_5$/WO$_x$—TiO$_2$ Reference and a commercially available wall-flow filter substrate.

FIG. 5 compares the pore volume of a different Reference with solid extruded $V_2O_5$/$WO_x$—$TiO_2$ materials prepared using other pore modifiers set out in Table 2 compared also with a commercially available wallflow filter (NGK). It can be seen from the graph that the inclusion of pore modifiers has improved the porosity and pore volume of the Reference extruded solid body so that the materials have properties approaching those of commercially available wall-flow filters.

Example 3

Extruded Wall-Flow Non-Zeolite SCR Filter

This is a prophetic example. An extruded monolith substrate containing $WO_3$—$CeO_2$—$ZrO_2$ catalyst of Example 12 may be prepared using an appropriate amount of $CeO_2$/$ZrO_2$ mixed oxide mixed with glass fibres, powdered synthetic boehmite (Disperal), and ammonium metatungstate and processed in an aqueous solution with a pH-value of about 4 into a shapeable and flowable slip containing a wt % of 4.5 wt % cellulose (CMC-QP10000H) and 3.5 wt % of the organic auxiliary agent PEO Alkox (a polyethylene oxide) and a total of 13 wt % of a mixture of the pore modifiers Rettenmaier BC200, a natural cellulosic material, and PAN fibres. The quantitative proportions of the starting materials may be selected in such a way that the active material of the finished solid catalyst body may contain 63.6% by weight of $CeO_2$/$ZrO_2$, 15.9% by weight of γ-$Al_2O_3$, 12.5 by weight of tungstate ($WO_3$) and 8% by weight of glass fibres. Typically, it would be expected that the resulting product would have a mean pore size of approximately 10 μm.

The extruded flow-through monolith substrate comprising a plurality of channels may be made into a wall-flow filter arrangement whereby a plurality of first channels is plugged at an upstream end and a plurality of second channels not plugged at the upstream end are plugged at a downstream end, wherein the arrangement of the first and second channels is such that laterally and vertically adjacent channels are plugged at opposite ends in the appearance of a checkerboard by inserting substantially gas impermeable plugs at the ends of the channels in the desired pattern according to EP 1837063. This filter arrangement is also disclosed in SAE 810114.

For the avoidance of any doubt, the entire contents of any and all documents cited herein are incorporated herein by reference.

The invention claimed is:

1. A method of treating exhaust gas emissions from internal combustion engines and having oxides of nitrogen and soot, which method comprising passing the exhaust gas through a wall-flow filter in the presence of a nitrogenous reductant, which filter comprising a layer of catalyst coated on an inert filter substrate, and catalysing soot combustion by oxygen and selective reduction of oxides of nitrogen, the steps of catalyzing soot combustion by oxygen and selective reduction of oxides of nitrogen each consisting of contacting the exhaust gas to the layer of the catalyst, the catalyst comprises ceria that is optionally stabilised and at least one metal selected from (i) tungsten and (ii) both tungsten and iron.

2. A method according to claim 1 further comprising injecting the nitrogenous reductant with an injector means into the exhaust gas, wherein the wall-flow filter is disposed downstream of the injector means.

3. A method according to claim 2, wherein the catalyst has a total metal content from 5 to 15% by weight.

4. A method according to claim 2, wherein the porosity of the wall-flow filter is from 30-80%.

5. A method according to claim 2 further comprising oxidising nitric oxide in the exhaust gas to nitrogen dioxide with an oxidation catalyst disposed upstream of the injector means.

6. A method according to claim 2, wherein the ceria of the catalyst is stabilised with a ceria stabiliser and the ceria stabiliser is selected from the group consisting of zirconium, lanthanides and mixtures of any two or more thereof.

7. A method according to claim 6, wherein the ceria stabiliser is a lanthanide selected from the group consisting of La, Nd, Pr, Gd, and mixtures of any two or more thereof.

8. A method according to claim 6, wherein the ceria is stabilised with zirconia, and the catalyst has a weight ratio of zirconia:ceria greater than 0:1 and less than or equal to 9:1.

9. A method according to claim 8, wherein the weight ratio of zirconia:ceria is 1:4 to 4:1.

10. A method according to claim 2, wherein the catalyst further comprises alumina stabilised with a stabiliser selected from the group consisting of silicon, zirconium, barium, lanthanides and mixtures of any two or more thereof.

11. A method according to claim 10, wherein the stabiliser is a lanthanide selected from the group consisting of La, Ce, Nd, Pr, Gd, and mixtures of any two or more thereof.

12. A method according to claim 1, wherein the ceria is stabilised with a ceria stabiliser and the ceria stabiliser is selected from the group consisting of zirconium, lanthanides and mixtures of any two or more thereof.

13. A method according to claim 12, wherein the ceria stabiliser is a lanthanide selected from the group consisting of La, Nd, Pr, Gd, and mixtures of any two or more thereof.

14. A method according to claim 1, wherein the ceria is stabilised with zirconia, and the catalyst has a weight ratio of zirconia:ceria greater than 0:1 and less than or equal to 9:1.

15. A method according to claim 14, wherein the weight ratio of zirconia:ceria is 1:4 to 4:1.

16. A method according to claim 1, wherein the total metal content of the catalyst is from 5 to 15% by weight.

17. A method according to claim 1, wherein the porosity of the wall-flow filter is from 30-80%.

18. A method according to claim 1, wherein the catalyst further comprises alumina stabilised with a stabiliser selected from the group consisting of silicon, zirconium, barium, lanthanides and mixtures of any two or more thereof.

* * * * *